(12) United States Patent
Baek et al.

(10) Patent No.: US 8,794,919 B2
(45) Date of Patent: Aug. 5, 2014

(54) WIND TURBINE BLADE WITH VARIABLE TRAILING EDGE

(75) Inventors: Peter Baek, Kolding (DK); Peter Grabau, Kolding (DK)

(73) Assignee: LM Glasfiber A/S, Kolding (DK)

( * ) Notice: Subject to any disclaimer, the term of this patent is extended or adjusted under 35 U.S.C. 154(b) by 481 days.

(21) Appl. No.: 13/175,414

(22) Filed: Jul. 1, 2011

(65) Prior Publication Data

US 2012/0009064 A1    Jan. 12, 2012

(30) Foreign Application Priority Data

Jul. 6, 2010   (EP) .................................... 10168529

(51) Int. Cl.
   *F03B 3/14*   (2006.01)

(52) U.S. Cl.
   USPC ............................................................ 416/1

(58) Field of Classification Search
   USPC .......... 416/37, 40, 146 R, 228, 231 B, 240, 1;
                                         415/4.3, 4.5; 290/44, 55
   See application file for complete search history.

(56) References Cited

U.S. PATENT DOCUMENTS

| | | | | |
|---|---|---|---|---|
| 5,320,491 | A * | 6/1994 | Coleman et al. | 416/24 |
| 6,966,758 | B2 * | 11/2005 | Grabau et al. | 416/229 R |
| 7,204,674 | B2 * | 4/2007 | Wobben | 416/1 |
| 7,419,356 | B2 * | 9/2008 | Stiesdal | 416/1 |
| 7,632,068 | B2 * | 12/2009 | Bak et al. | 416/23 |
| 7,902,686 | B2 * | 3/2011 | Andersen et al. | 290/44 |
| 7,918,653 | B2 * | 4/2011 | Standish et al. | 416/228 |
| 7,922,450 | B2 * | 4/2011 | Narasimalu | 416/23 |
| 7,963,484 | B2 * | 6/2011 | Raudszus et al. | 244/214 |
| 8,157,533 | B2 * | 4/2012 | Godsk et al. | 416/240 |
| 8,192,161 | B2 * | 6/2012 | Baker et al. | 416/23 |
| 8,215,908 | B2 * | 7/2012 | Altmikus et al. | 416/23 |

(Continued)

FOREIGN PATENT DOCUMENTS

| | | |
|---|---|---|
| DE | 197 19 221 C1 | 10/1998 |
| WO | 02/051730 A2 | 7/2002 |

(Continued)

*Primary Examiner* — Edward Look
*Assistant Examiner* — Eldon Brockman
(74) *Attorney, Agent, or Firm* — Nath, Goldberg & Meyer; Jerald L. Meyer; Sanjana Mangalagiri

(57) ABSTRACT

The present invention relates to a wind turbine blade for a rotor of a wind turbine having a substantially horizontal rotor shaft. The blade may comprise a profiled contour comprising a pressure side and a suction side as well as a leading edge and a trailing edge, a chord extending between the leading edge and the trailing edge, and the profiled contour generating a lift when being impacted by an incident airflow. In a cross section of the wind turbine blade perpendicular to a lengthwise direction of the wind turbine blade, a suction side point is defined on the suction side at the trailing edge of the blade, and a pressure side point is defined on the pressure side at the trailing edge of the blade. The suction side point is movable in relation to the pressure side point, and the blade is further provided with a displacement device configured to displace the pressure side point and the suction side point so that a distance between the suction side point and the pressure side point can be varied. The present invention further relates to a wind turbine including such a wind turbine blade and to a method of operating a wind turbine including such a wind turbine blade.

17 Claims, 4 Drawing Sheets

(56) References Cited

U.S. PATENT DOCUMENTS

Figure 1:
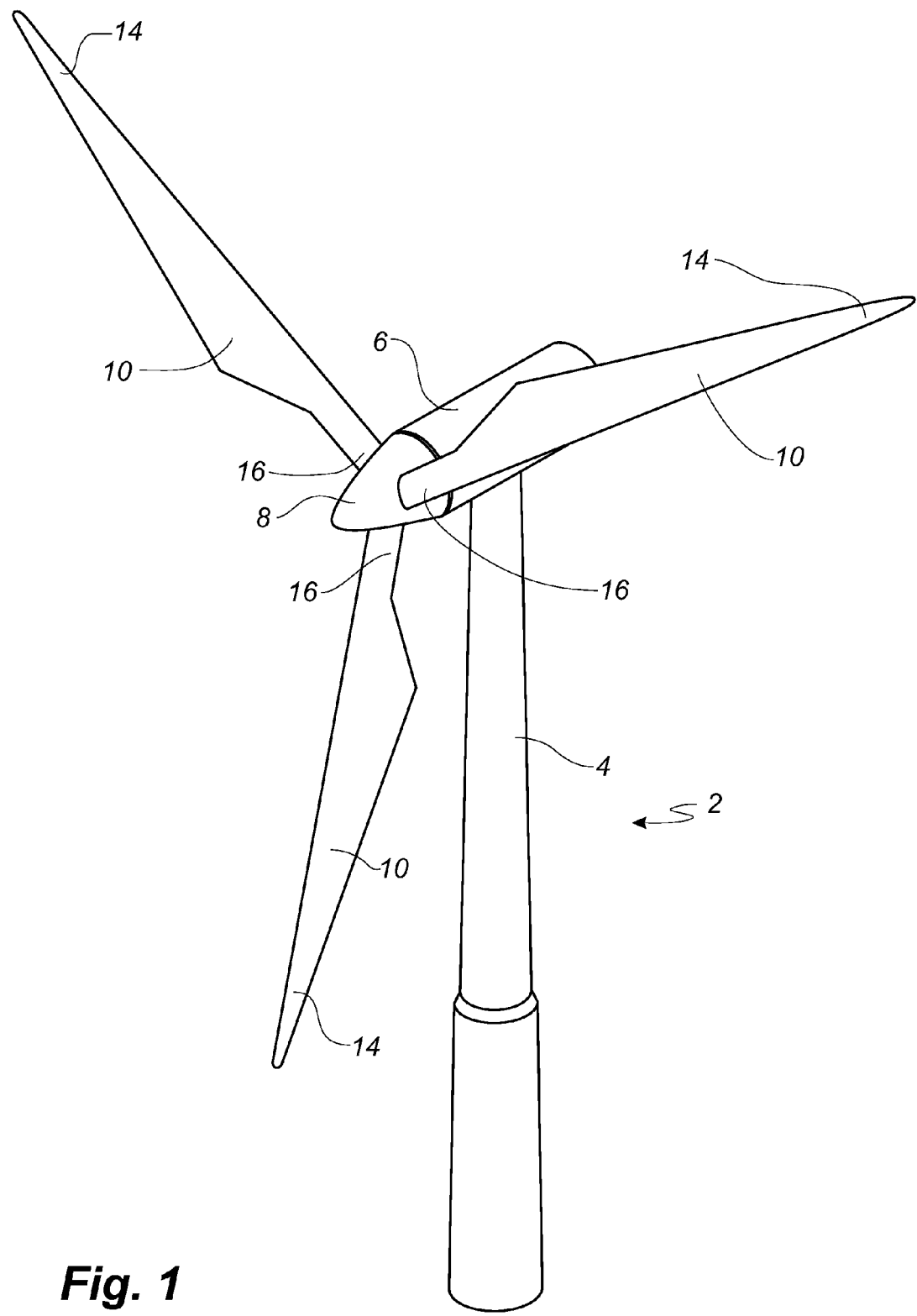

| | | | |
|---|---|---|---|
| 8,491,262 B2 * | 7/2013 | Mcgrath et al. | 416/1 |
| 2003/0091436 A1 * | 5/2003 | Stiesdal | 416/1 |
| 2004/0105752 A1 * | 6/2004 | Wobben | 415/4.1 |
| 2008/0240923 A1 * | 10/2008 | Bonnet | 416/223 R |
| 2008/0292461 A1 * | 11/2008 | Stiesdal | 416/147 |
| 2009/0028705 A1 * | 1/2009 | Meldgaard et al. | 416/23 |
| 2009/0097976 A1 * | 4/2009 | Driver et al. | 416/42 |
| 2010/0259046 A1 * | 10/2010 | Kota et al. | 290/44 |
| 2011/0133474 A1 * | 6/2011 | Haar | 290/55 |

FOREIGN PATENT DOCUMENTS

| | | |
|---|---|---|
| WO | 2007/045940 A1 | 4/2007 |
| WO | 2008/003330 A1 | 1/2008 |
| WO | 2009/061478 A1 | 5/2009 |

* cited by examiner

WIND TURBINE BLADE WITH VARIABLE TRAILING EDGE

The present invention relates to a wind turbine blade for a rotor of a wind turbine having a substantially horizontal rotor shaft, the blade comprising: a profiled contour comprising a pressure side and a suction side as well as a leading edge and a trailing edge, a chord extending between the leading edge and the trailing edge, the profiled contour generating a lift when being impacted by an incident airflow, in a cross section of the wind turbine blade perpendicular to a lengthwise direction of the wind turbine blade, a suction side point being defined on the suction side at the trailing edge of the blade, and a pressure side point being defined on the pressure side at the trailing edge of the blade. The invention further relates to a wind turbine comprising such a wind turbine blade and a method of controlling such a wind turbine blade.

Ideally, a wind turbine blade of the airfoil type is shaped similarly to the profile of an aeroplane wing, where the chord plane width of the wind turbine blade as well as the first derivative thereof increase continuously with decreasing distance from the hub. This results in the blade ideally being comparatively wide in the vicinity of the hub. This again results in problems when having to mount the wind turbine blade to the hub, and, moreover, this causes great loads during operation of the wind turbine blade, such as storm loads, due to the large surface area of the wind turbine blade.

Therefore, over the years, construction of wind turbine blades has developed towards a shape, where the wind turbine blade consists of a root region closest to the hub, an air-foil region comprising a lift-generating profile furthest away from the hub and a transition region between the root region and the airfoil region. The airfoil region has an ideal or almost ideal profiled contour shape with respect to generating lift, whereas the root region has a substantially circular cross-section, which reduces the storm loads and makes it easy and safe to mount the wind turbine blade to the hub. The root region diameter may advantageously be constant along the entire root region. Due to the circular cross-section, the root region does not contribute to the energy production of the wind turbine and, in fact, lowers this a little because of drag. As it is suggested by the name, the transition region has a shape gradually changing from the circular shape of the root region to the airfoil profile of the airfoil region. Typically, the width of the wind turbine blade in the transition region increases substantially linearly with increasing distance from the hub.

When the wind turbine blade is impacted by an incident airflow, the profiled contour generates a lift. When the wind turbine blade is mounted on a wind turbine, the wind turbine hub begins to rotate due to the lift. By incident flow is meant the inflow conditions at a profiled contour section during normal use of the wind turbine blade, i.e. rotation on a wind turbine rotor. Thus, the incoming flow is the inflow formed by the resultant of the axial wind speed and the rotational component, as it is seen by the local section of the profiled contour.

As for instance wind turbine blades for wind turbines have become increasingly bigger in the course of time and may now be more than 60 meters long, the demand for optimised aerodynamic performance has increased. The wind turbine blades are designed to have an operational lifetime of at least 20 years. Therefore, even small changes to the overall performance of the wind turbine blade may accumulate over the lifetime of a wind turbine blade to a high increase in financial gains, which surpasses the additional manufacturing costs relating to such changes.

As the requirement for effectiveness of a wind turbine is increased, there is a need for increasing the effectiveness or performance of wind turbine blades or wind turbine blades.

The size of the chord is of importance to the performance of a wind turbine blade and in particular to the performance of the blade at different wind speeds. A blade having one chord length may for a relative profile perform optimally at one angle of attack at a given tip speed ratio, while another chord length may perform optimally at another angle of attack at yet another given tip speed ratio. This is, at least partly, attempted to be overcome by pitching and otherwise adapting the aerodynamic properties of the blades.

It is an object of the invention to obtain a new wind turbine blade, which overcomes or ameliorates at least one of the disadvantages of the prior art, or which provides a useful alternative.

According to a first aspect, the invention provides a wind turbine blade according to the aforementioned kind, wherein the suction side point is movable in relation to the pressure side point, and that the blade is further provided with a displacement device configured to displace the pressure side point and the suction side point so that a distance between the suction side point and the pressure side point can be varied.

In one embodiment, the suction side point and the pressure side point have an interception point. This provides the possibility to adapt the aerodynamic properties of the wind turbine blade by actively changing the length of the chord or camber of the wind turbine blade. Preferably, the displacement device may be varied between two extreme positions, viz. between the position where the distance between the suction side point and the pressure side point is the smallest and the position where the distance between the suction side point and the pressure side point is the largest. Preferably, the displacement device is able to stop in any position between the two extreme positions so that the chord or lift of the particular section may be varied accurately.

The displacement device provides the possibility to adapt the aerodynamic properties of the wind turbine actively. The adaptation of the wind turbine blade may allow control of the lift of the wind turbine blade. This further allows control of the loads on the wind turbine blade arising from inflow conditions. If actively controlled, it may be used for ensuring that the operation of the wind turbine blade may be continued in increasing wind conditions compared to wind turbine blades not having this feature. Thus, the displacement device may for instance be used for lowering the lift compared to a basis lift at a design point of the blade. Thereby, it may for instance be possible to decrease the lift of a section near the tip of the blade, whereby longer blades can be used, and/or the blade can be used at higher wind speeds.

The displacement device may also vary the chord or chord length of the wind turbine blade. The chord length may be varied by a physical device, but in some embodiments the adapted chord may be considered virtual, e.g. in an embodiment where the blade shape is changed between a profile with a substantially pointed trailing edge to a truncated trailing edge shape, the virtual chord length is understood to be the distance between the leading edge and the point, where the airstreams meet behind the trailing edge.

In one embodiment, the displacement device is adapted to vary the distance between the suction side point and the pressure side point between a closed, first state, where the suction side point and the pressure side point are connected, and an open, second state, where the suction side point and the pressure side point are spaced apart. Thus, the blade section can be varied between a normal airfoil profile and a truncated profile or flatback profile, where the suction side and pressure side of the blade so to speak are moved apart. Flatback profiles functions best with a relative thick profile. Therefore, according to an advantageous embodiment, the profile has a relative thick profile, i.e. the ratio between the maximum thickness and the chord length of the profile is relatively high. This also has advantageous with respect to stiffness or strength of the blade, since a thick profile can be stiffer or stronger than a thin profile.

In one embodiment, the displacement device is a wedge-shaped device being movable in a direction substantially parallel to the chord so that the distance between the suction side point and the pressure side point is increased when the wedge-shaped device is moved in a direction away from the leading edge and decreased when the wedge-shaped device is moved in a direction towards the leading edge.

The wedge-shaped device may for instance be triangular shaped, such as an isosceles triangle, with an apex point facing away from the leading edge. Thus, when the device is moved away from the leading edge, one side of the device will form part of the pressure side of the blade, and another side of the device will form part of the suction side of the blade. Obviously, other usable shapes for the displacement device are also contemplated, such as a diamond shape.

In one embodiment, the displacement device comprises a flexible membrane defining an interior volume that may be expanded in volume by admitting a fluid to the interior volume. The fluid may be provided from a fluid reservoir.

In one embodiment, the fluid is a gas and/or liquid. In one embodiment, the fluid is water, oil, pressurised air or an inert gas. It is preferred that the fluid does not pose a threat, i.e. being able to ignite and/or explode.

In one embodiment, the displacement device comprises movable bars, wherein the bars are connected to the suction side and the pressure side, respectively, so that change in the length of a bar translates to a change in a relative position between the suction side point and/or pressure side point. The bars may be operated by hydraulics, pneumatics or mechanically, e.g. via threaded bars, telescope legs or the like.

In one embodiment, the wind turbine blade further comprises a flow sensor configured to determine flow conditions at or upwind of the wind turbine blade. The flow sensor may also be installed on the wind turbine itself, e.g. a LIDAR. Advantageously the wind turbine blade may further comprise a control unit configured to control the operation of the displacement device in response to wind condition information from the flow sensor and/or an external source providing information regarding the wind conditions at the wind turbine blade. This may allow the blade to be operated optimally in changing wind and/or flow conditions. In another embodiment, a load sensor is used, e.g. to measure bending moments. Measurements from such a sensor may also be used for control of the displacement means. Yet again, the sensor may be adapted to measure other operational parameters of the wind turbine blade or a wind turbine provided with such a wind turbine blade, and the displacement means be controlled dependent on the measurement.

In one embodiment, the wind turbine blade in the radial direction is divided into a root region with a substantially circular or elliptical profile closest to a root end of the blade (or equivalently the hub), an airfoil region with a lift generating profile closest to a tip end of the blade (or equivalently furthest away from the hub), and preferably a transition region between the root region and the airfoil region, the transition region having a profile gradually changing in the radial direction from the circular or elliptical profile of the root region to the lift generating profile of the airfoil region, and the displacement device being located in the airfoil region. In another embodiment, the displacement device is located in the transition region also.

Obviously, the displacement device may comprise a plurality of individual displacement devices. Thereby, it is possible to change the chord length and/or the lift of individual longitudinal parts of the blade. Thus, it is for instance possible to decrease the lift of an outboard or outmost part of the blade in order to minimise loading and be able to use the wind turbine blade at higher wind speeds. If the wind speed increases even further, the lift of more and more outboard sections may be reduced, e.g. sequentially from a displacement device nearest the tip towards a displacement device closest to the root.

According to an advantageous embodiment, the displacement device is adopted to vary the lift of the cross-section with at least 20%, advantageously at least 30%, and more advantageously at least 40%.

Advantageously, the blade comprises a plurality of displacement devices located in separate lengthwise sections of the blade, the displacement devices being separately controllable.

According to a second aspect, the invention provides a wind turbine comprising: a tower having a first end and an opposite second end, the second end connecting the tower to the ground or a foundation, a nacelle arranged at the first end of the tower and having a substantially horizontal rotor shaft, a hub connected to the rotor shaft, and a number, preferably two or three, wind turbine blades according to any of the aforementioned embodiments extending in a substantially radial direction from the hub.

In one embodiment, the wind turbine or the wind turbine blade further comprises a sensor for measuring operational conditions, and a control device for controlling the displacement device in response to measurements from the sensor. The sensor may for instance be a flow sensor configured to determine inflow conditions at the wind turbine and/or the wind turbine blade, a control device configured to receive information from the flow sensor and/or an external device providing flow condition information, the control device operating the displacement device in response to flow condition information. This may allow the blade to be operated optimally in changing wind and/or flow conditions. However, the sensor may also be a load sensor configured to determine load conditions at the wind turbine blade, a rotation sensor configured to determine tip speed ratio of the wind turbine blade, an accelerometer configured to determine acceleration of the wind turbine blade, a sensor configured to determine centrifugal force at the wind turbine blade, or the like.

According to a third aspect, the invention provides a method of controlling a wind turbine comprising a wind turbine blade according to the aforementioned kind, wherein the method comprises the step of: a) controlling the displacement device so as to vary the distance between the suction side point and the pressure side point so as to vary the lift of a lengthwise section of the blade comprising the displacement device. Advantageously the method comprises the step of: b) determining an operational condition of the wind turbine, such as inflow properties or load conditions, and carrying out step a) in dependence on the operational condition.

Figure 2:
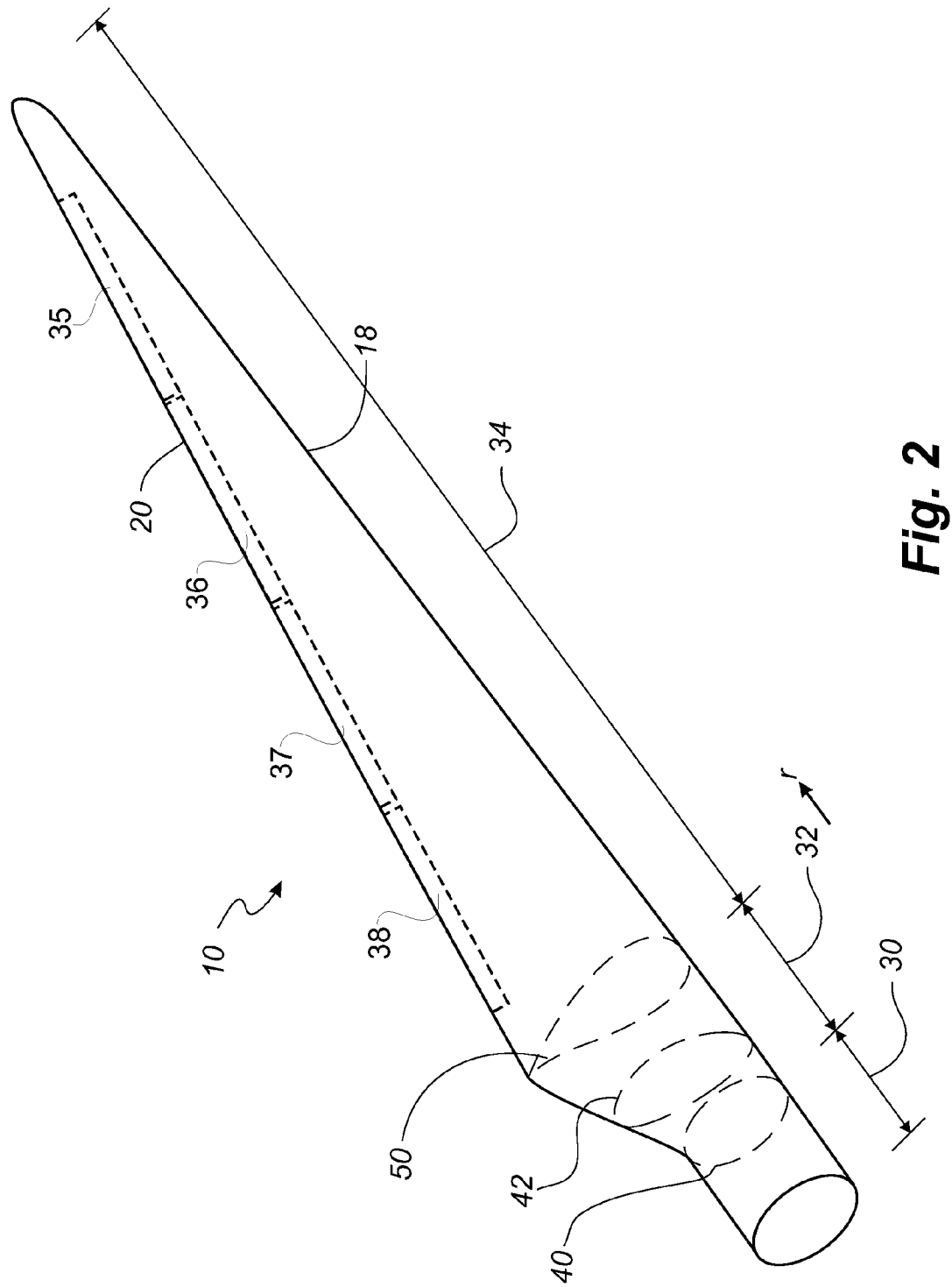
Figure 3:
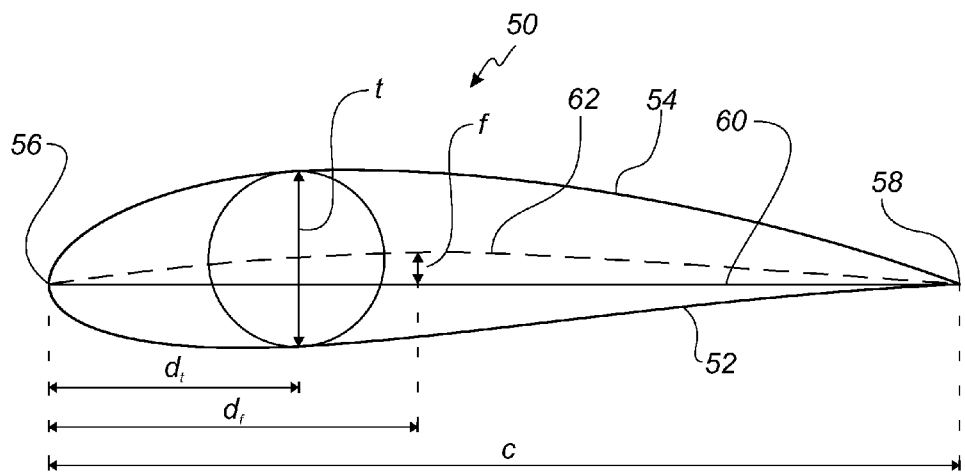
Figure 4:
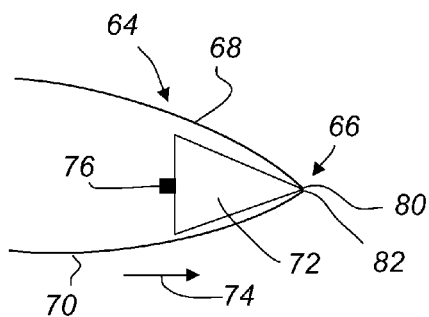
Figure 5:
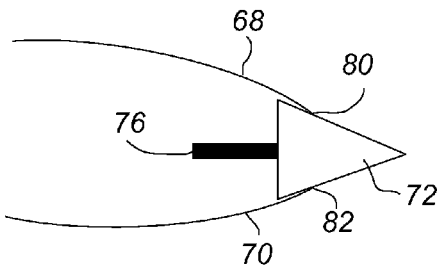
Figure 6:
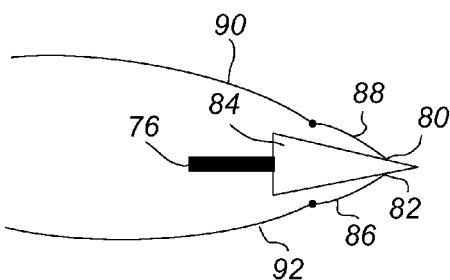
Figure 7:
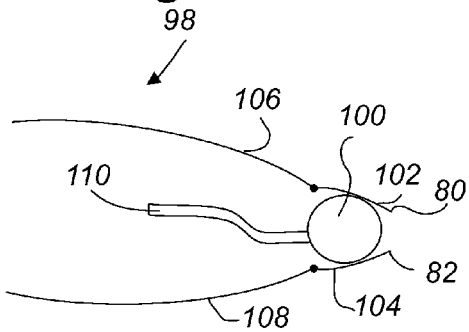
Figure 8:
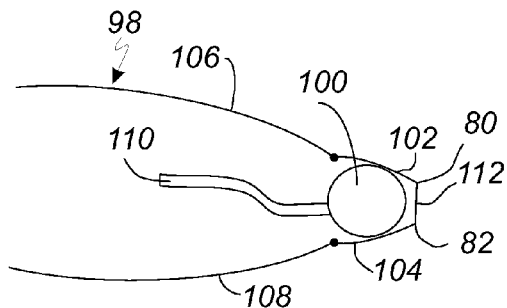
Figure 9:
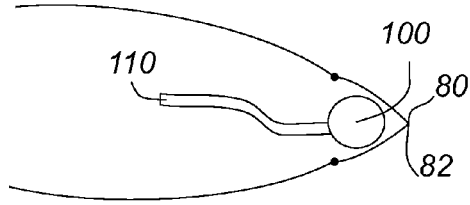
Figure 10:
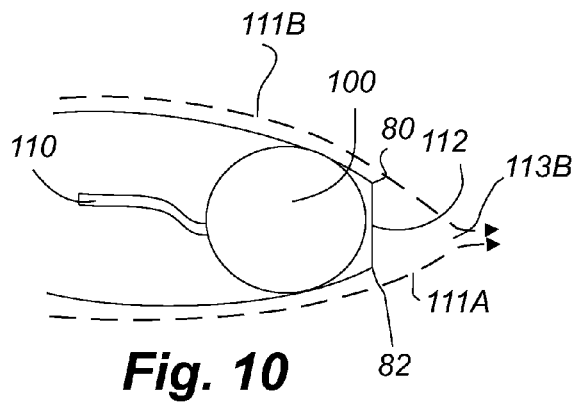
Figure 11:
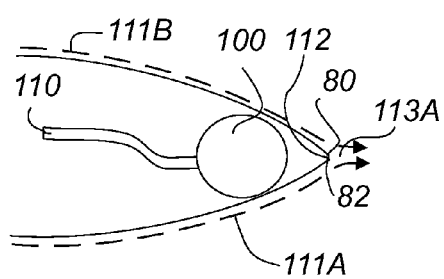
Figure 12:
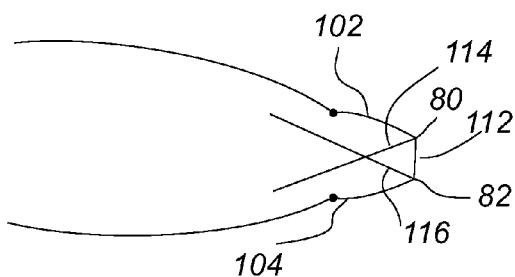

The present invention will be described in more detail with reference to the appended drawings in which:

FIG. 1 is a schematic illustration of a wind turbine,

FIG. 2 is a schematic illustration of a wind turbine blade according to the invention, FIG. 3 is a schematic illustration of a cross-section of a wind turbine blade, FIG. 4 is a schematic illustration of a cross-section of an embodiment of a wind turbine blade with a displacement device in a first state, FIG. 5 is a schematic illustration of a cross-section of an embodiment of a wind turbine blade with a displacement device in a second state, FIG. 6 is a schematic illustration of a cross-section of an embodiment of a wind turbine blade, FIG. 7 is a schematic illustration of a cross-section of an embodiment of a wind turbine blade with a second embodiment of a displacement device, FIG. 8 is a schematic illustration of a cross-section of an embodiment of a wind turbine blade with a second embodiment of a displacement device, FIG. 9 is a schematic illustration of a cross-section of an embodiment of a wind turbine blade with a second embodiment of a displacement device, FIG. 10 is a schematic illustration of a cross-section of an embodiment of a wind turbine blade with a second embodiment of a displacement device in a second state, FIG. 11 is a schematic illustration of a cross-section of an embodiment of a wind turbine blade with a second embodiment of a displacement device, and FIG. 12 is a schematic illustration of a cross-section of a wind turbine blade with a third embodiment of a displacement device.

FIG. 1 is a schematic illustration of a conventional modern upwind wind turbine according to the so-called "Danish concept" with a tower 4, a nacelle 6 and a rotor with a substantially horizontal rotor shaft. The rotor includes a hub 8 and three wind turbine blades 10 extending radially from the hub 8, each having a blade root 16 nearest the hub and a blade tip 14 furthest from the hub 8.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which, during use, normally face the windward side and the leeward side, respectively, i.e. during rotation of the rotor. The airfoil 50 has a chord 60 with a chord length c extending between a leading edge 56 and a trailing edge 58 of the wind turbine blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line may be found by drawing inscribed circles from the leading edge 56 to the trailing edge 58. The median line follows the centres of these inscribed circles, and the deviation or distance from the chord 60 is called the camber f. The asymmetry may also be defined by use of parameters called the upper camber and lower camber, which are defined as the distances from the chord 60 and the suction side 54 and pressure side 52, respectively.

FIG. 2 illustrates a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The wind turbine blade 10 comprises a leading edge 18 facing the direction of rotation of the wind turbine blade 10, when the wind turbine blade is mounted on the hub, and a trailing edge 20 facing the opposite direction of the leading edge 18.

The airfoil region 34 (also called the profiled region) has an ideal or almost ideal profiled contour shape with respect to generating lift, whereas the root region 30 has a substantially circular or elliptical cross-section due to structural considerations, which for instance makes it easy and safe to mount the wind turbine blade 10 to the hub. Typically, the diameter (or the chord) of the root region 30 is constant along the entire root area 30. The transition region 32 has a transitional profile 42 gradually changing from the circular or elliptical shape 40 of the root region 30 to the airfoil profile 50 of the airfoil region 34. Typically, the width of the transition region 32 increases substantially linearly with increasing distance r from the hub.

The airfoil region 34 has an airfoil profile 50 with a chord extending between the leading edge 18 and the trailing edge 20 of the wind turbine blade 10. The width of the chord decreases with increasing distance r from the hub.

Normally, the chords of different sections of the wind turbine blade do not lie in a common plane since the wind turbine blade may be twisted and/or curved (i.e. pre-bent) thus providing the chord plane with a correspondingly twisted and/or curved course. Most often, this is the case in order to compensate for the local velocity of the wind turbine blade being dependent on the radius from the hub.

The wind turbine blade 10 according to the invention is provided with a number of displacement devices 35-38 for varying a distance between the suction side and the pressure side at the trailing edge 20 of the blade 10. The displacement devices 35-38 are arranged in separate lengthwise sections of the blade and are preferably individual controllable, for instance based on operational conditions of the wind turbine or wind turbine blade 10. Such operational conditions may be loading of the blade and or wind speed measurements and may be detected by a dedicated sensor. The displacement devices 35-38 may for instance be adapted to lower the lift of the corresponding lengthwise section compared to a basis condition of the section of the wind turbine blade 10. If wind speeds or loading exceeds a first given threshold value, the outmost displacement device 35 may be activated to lower the lift of an outmost section, and if wind speeds or loading exceeds a second threshold value, the second outmost displacement device 36 may also be activated in order to lower the lift of the second outmost section, and so forth until all displacement devices 35-38 are activated to lower the lift. Thereby, it is possible to decrease the lift and loading of outmost part of the blade, which in turn means that the blade can be used in a wider wind speed range and that the blades may be longer than conventional blades. Thereby, the annual energy production of a wind turbine using such blades may be increased compared to wind turbines using conventional blades.

FIGS. 4-12 illustrate cross-sections of embodiments of wind turbine blades according the invention provided with displacement devices.

FIG. 4 is a schematic illustration of a cross-section 64 of an airfoil profile or wind turbine blade with a variable geometry. The shape of a trailing edge 66 of the airfoil profile 64 may be varied. The wind turbine blade illustrated is configured for a rotor of a wind turbine having a substantially horizontal rotor shaft. The wind turbine blade comprises a profiled contour comprising a pressure side 70 and a suction side 68 as well as a leading edge, not illustrated here, and a trailing edge 66, a chord extending between the leading edge and the trailing edge 66, the profiled contour generating a lift when being impacted by an incident airflow. In the cross section of the wind turbine blade perpendicular to the lengthwise direction of the wind turbine blade, a suction side point 80 is defined on the suction side 68, and a pressure side point 82 is defined on the pressure side 70, both point being located at the trailing edge 66 of the blade profil 64. In the shown state, the suction side point 80 and the pressure side point 82 meet at an interception point.

Both the suction side 68 and the pressure side 70 of the wind turbine blade are flexible in this embodiment, whereby a distance between the suction side point 80 and the pressure side point may be varied. A wedge-shaped body 72 is arranged inside the wind turbine blade. The wedge-shaped body 72 is movable in a direction away from the leading edge of the airfoil profile 64 in the direction of the arrow 74 along the chord of the profile. The wedge-shaped body 72 may also be retracted to the starting position illustrated in FIG. 4. The wedge-shaped body 72 is illustrated in a first position, where the pressure side 70 and the suction side 68 are in contact. An actuator 76 is used to move the wedge-shaped body 72 along the chord of the blade profile. When a longer chord is desired, the wedge-shaped body 72 is moved out of the airfoil profile 64, as illustrated in FIG. 5. The wedge-shaped body 72 is movable between the first position and a second position, such as illustrated in FIG. 5. Further the wedge-shaped body 72 may assume a position between the two positions so as to establish any desired chord or camber length.

FIG. 5 illustrates the embodiment of FIG. 4, where the wedge-shaped body 72 now extends from the opening defined by the suction side point 80 at the suction side 68 of the airfoil profile 64 and the pressure side point 82 at the pressure side 70 of the airfoil profile 64. In FIG. 5, the wedge-shaped body 72 is in a second position, where the pressure side 70 and the suction side 68 are no longer in contact and the suction side point 80 and the pressure side point 82 are displaced relative to each other. Thereby, a distance is defined between the suction side point 80 and the pressure side point 82.

As the wedge-shaped body 72 is moved from the first position to the second position, the airfoil profile is transformed so that the overall chord of the profile in FIG. 5 is larger than the overall chord of the profile in FIG. 4. In the second state, one part of the wedge-shaped body 72 forms part of the pressure side of the blade profile, whereas another part of the wedge-shaped body 72 forms part of the suction side of the blade profile.

When actively controlled, it is envisioned that the wind turbine blade performs better than an airfoil profile without adaptation of blade profile. The increased chord is contemplated to increase the lift of the airfoil profile. When the wind speed drops, or the angle of attack is low, the increased chord will maintain a constant lift, whereas when the wind speed increases, or the angle of attack becomes high, the decreased chord will maintain a constant lift. This way, the vibrations can be reduced, thereby lowering the fatigue damage. By reducing the chord the extreme loads are also reduced.

FIG. 6 schematically illustrates an embodiment, where a wedge-shaped body 84 abuts two movable parts 86 and 88 attached to the suction side 90 and pressure side 92, respectively. The parts 86 and 88 are hinged to the pressure side 92 and suction side 90, respectively. In other embodiments, the parts 86 and 88 may be connected to the suction side 90 and pressure side 92, respectively, in other advantageous ways.

FIG. 7 is a schematic illustration of an embodiment, where an airfoil profile 98 comprises a displacement device 100 in the form of an expandable device. FIG. 7 illustrates the device 100 in an expanded state. Two parts 102 and 104 are connected hingedly to the suction side 106 and pressure side 108, respectively. The displacement device 100 may expand and/or contract in order to adapt to the airfoil profile 98. Preferably, the size of the device 100 may change gradually. The device 100 is connected via a conduit 110 to a pressure source, not illustrated.

FIG. 8 illustrates an embodiment schematically, where an airfoil profile 98 comprises a displacement device 100 in the form of an expandable device, similar to that of FIG. 7. In this embodiment, a flexible membrane 112 is provided at the trailing edge of the air-foil profile 98. It is also possible to omit the flexible foil so that an open truncated trailing edge is formed.

FIG. 9 illustrates a state schematically, where the device 100 is collapsed, and the parts 102 and 104 are in contact.

FIG. 10 is a schematic illustration of an airfoil profile 98 and a displacement device 100 being an expandable device. The displacement device 100 is in direct contact with the pressure side 108 and suction side 106. A large part of the pressure side 108 and suction side 106 is moved or displaced by the displacement device 100. A flexible membrane 112 is provided at the trailing edge of the blade profile. The flexible membrane 112 seals the inside of the airfoil profile, which is contemplated to reduce turbulence and reduce collection of water and/or dirt in the blade. It is also possible to omit the flexible membrane so that an open truncated trailing edge is formed. The displacement device 100 is illustrated in an expanded state where a truncated profile or flatback profile having a virtual chord length is established. The punctured lines 111A and 111B illustrate the air flowing at the pressure side and suction side, respectively. The two air flows meet at a point a distance from the trailing edge of the wind turbine blade.

FIG. 11 is a schematic illustration of the airfoil profile 98 of FIG. 10 in a second state, where the displacement device 10 does not displace any part of the pressure side 108 and suction side 106, respectively. The two air flows 111A and 111B meet at a point very near the trailing edge of the wind turbine blade.

FIG. 12 is a schematic illustration of an airfoil profile 98 with a displacement device 100 comprising two bars 114 and 116. The bars 114 and 116 may expand or be retracted. The change in length of the bars 114 and 116 manipulates the position of the parts 102 and 104, respectively. The bars may for instance be pneumatically or hydraulically operated. The bars may also be arranged substantially perpendicularly to the chord so that the bars may push apart alternatively pull towards each other on the pressure side and the suction side. In an advantageous embodiment, the hinged parts 102, 104 are omitted so that the bars are installed between a flexible pressure side and suction side, similar to the embodiments shown in FIGS. 4 and 10.

The invention claimed is:

1. A wind turbine blade for a rotor of a wind turbine having a substantially horizontal rotor shaft, the blade comprising:
   a profiled contour comprising a pressure side and a suction side as well as a leading edge and a trailing edge, a chord extending between the leading edge and the trailing edge, the profiled contour generating a lift when being impacted by an incident airflow,
   in a cross section of the wind turbine blade perpendicular to a lengthwise direction of the wind turbine blade,
   a suction side point being defined on the aft-most point of the suction side at the trailing edge of the blade, and
   a pressure side point being defined on the aft-most point of the pressure side at the trailing edge of the blade, wherein the suction side and pressure side of the blade are flexible such that the suction side is movable in relation to the pressure side via a displacement device configured to displace the pressure side and the suction side so that a distance between the suction side point and the pressure side point can be varied between a closed, first state, where the suction side point and the pressure side point are connected, and an open, second state, where the suction side point and the pressure side point are spaced apart.

2. The wind turbine blade according to claim 1, wherein the displacement device comprises a wedge-shaped device being movable along the chord so that the distance between the suction side point and the pressure side point is increased when the wedge-shaped device is moved in a direction away from the leading edge.

3. A wind turbine blade according to claim 1, wherein the displacement device comprises a flexible membrane defining an interior volume that may be expanded in volume by admitting a fluid to the interior volume.

4. A wind turbine blade according to claim 3, wherein the fluid is an inert gas.

5. A wind turbine blade according to claim 3, wherein the fluid is water or oil.

6. A wind turbine blade according to claim 1, wherein the displacement device comprises movable bars, wherein the bars are connected to the suction side and the pressure side, respectively, so that change in the length of a bar translates to a change in a relative position between the suction side point and/or pressure side point.

7. A wind turbine blade according to claim 1, further comprising a flow sensor configured to determine inflow conditions at the wind turbine blade or at an upwind direction of the wind turbine blade.

8. A wind turbine blade according to claim 1, further comprising a control unit configured to control the operation of the displacement device in response to inflow condition information from a flow sensor configured to determine inflow conditions at the wind turbine blade or at an upwind direction of the wind turbine blade and/or an external source providing information regarding the wind and/or flow conditions at the wind turbine blade.

9. A wind turbine blade according to claim 1, wherein the wind turbine blade in the radial direction is divided into a root region with a substantially circular or elliptical profile closest to a root end of the blade, an airfoil region with a lift generating profile nearest a tip end of the blade, and preferably a transition region between the root region and the airfoil region, the transition region having a profile gradually changing in the radial direction from the circular or elliptical profile of the root region to the lift generating profile of the airfoil region, and the displacement device being located in the airfoil region.

10. A wind turbine blade according to claim 1, wherein the displacement device is adopted to vary the lift of the cross-section with at least 20%.

11. A wind turbine blade according to claim 1, wherein the displacement device is adopted to vary the lift of the cross-section with at least 30%.

12. A wind turbine blade according to claim 1, wherein the displacement device is adopted to vary the lift of the cross-section with at least 40%.

13. A wind turbine blade according to claim 1, wherein the blade comprises a plurality of displacement devices located in separate lengthwise sections of the blade, the displacement devices being separately controllable.

14. A wind turbine comprising:
a tower having a first end and an opposite second end, the second end connecting the tower to the ground or a foundation,
a nacelle arranged at the first end of the tower and having a substantially horizontal rotor shaft, a hub connected to the rotor shaft, and
a number, preferably two or three, wind turbine blades according to claim 1, extending in a substantially radial direction from the hub.

15. A wind turbine according to claim 14, wherein the wind turbine or the wind turbine blade comprises a sensor for measuring operational conditions, and a control device for controlling the displacement device in response to measurements from the sensor.

16. A method of controlling a wind turbine comprising a wind turbine blade, wherein the blade comprises:
a profiled contour comprising a pressure side and a suction side as well as a leading edge and a trailing edge, a chord extending between the leading edge and the trailing edge, the profiled contour generating a lift when being impacted by an incident airflow,
in a cross section of the wind turbine blade perpendicular to a lengthwise direction of the wind turbine blade,
a suction side point being defined on the aft-most point of the suction side at the trailing edge of the blade, and
a pressure side point being defined on the aft-most point of the pressure side at the trailing edge of the blade, wherein the suction side and pressure side of the blade are flexible such that the suction side is movable in relation to the pressure side via a displacement device configured to displace the pressure side point and the suction side point so that a distance between the suction side point and the pressure side point can be varied between a close, first state, where the suction side point and the pressure side point are connected, and an open, second state, where the suction side point and the pressure side point are spaced apart, wherein the method comprises the step of:
a) controlling the displacement device so as to vary the distance between the suction side point and the pressure side point so as to vary the lift of a lengthwise section of the blade comprising the displacement device.

17. A method according to claim 16, wherein the method further comprises the step of:
b) determining an operational condition of the wind turbine, with respect to inflow properties or load conditions, and carrying out step a) in dependence on the operational condition.

* * * * *